(12) United States Patent
Yoshida (10) Patent No.: US 8,179,515 B2
(45) Date of Patent: May 15, 2012

(54) APPARATUS AND METHOD FOR MANUFACTURING LIQUID CRYSTAL DISPLAY PANEL

(75) Inventor: Tokuo Yoshida, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 536 days.

(21) Appl. No.: 12/524,194

(22) PCT Filed: Nov. 12, 2007

(86) PCT No.: PCT/JP2007/071921
§ 371 (c)(1),
(2), (4) Date: Jul. 23, 2009

(87) PCT Pub. No.: WO2008/111258
PCT Pub. Date: Sep. 18, 2008

(65) Prior Publication Data
US 2010/0105276 A1    Apr. 29, 2010

(30) Foreign Application Priority Data
Mar. 12, 2007 (JP) .................................. 2007-061467

(51) Int. Cl.
G02F 1/1339 (2006.01)
G02F 1/1341 (2006.01)
(52) U.S. Cl. ............................ 349/187; 349/190; 445/26
(58) Field of Classification Search .................... None
See application file for complete search history.

(56) References Cited

U.S. PATENT DOCUMENTS

| | | | |
|---|---|---|---|
| 5,978,065 A * | 11/1999 | Kawasumi et al. ........... | 349/188 |
| 6,739,929 B2 * | 5/2004 | Furukawa et al. ............. | 445/24 |
| 6,830,947 B2 | 12/2004 | Kamiya et al. | |
| 7,050,141 B2 | 5/2006 | Yokoue | |
| 7,150,298 B2 | 12/2006 | Kamiya et al. | |
| 2007/0026589 A1 | 2/2007 | Kamiya et al. | |

FOREIGN PATENT DOCUMENTS

| | | | |
|---|---|---|---|
| JP | 62-066229 A | | 3/1987 |
| JP | 8-95069 A | * | 4/1996 |
| JP | 09-005723 A | | 1/1997 |
| JP | 2000-029051 A | | 1/2000 |
| JP | 2002-303871 A | | 10/2002 |
| JP | 2004-170777 A | | 6/2004 |

OTHER PUBLICATIONS

Official Communication issued in International Patent Application No. PCT/JP2007/071921, mailed on Feb. 12, 2008.

* cited by examiner

*Primary Examiner* — Mike Stahl
(74) *Attorney, Agent, or Firm* — Keating & Bennett, LLP (57) ABSTRACT

In a method for manufacturing a liquid crystal display panel, a sealant having a cut-out formed at least on the other end side of a display region is provided on one film substrate. A liquid crystal material is supplied to one end side of the display region in the one film substrate or the other film substrate. An apparatus for manufacturing a liquid crystal display panel includes a bonding unit arranged to bond the pair of film substrates and to each other through the sealant and the liquid crystal material by pressing respective surfaces of the film substrates and so that a pressure in a middle of the film substrates and becomes higher than that at both ends thereof, and a sealing unit arranged to seal the cut-out of the sealant to the pair of film substrates and bonded in the bonding unit.

18 Claims, 7 Drawing Sheets

APPARATUS AND METHOD FOR MANUFACTURING LIQUID CRYSTAL DISPLAY PANEL

BACKGROUND OF THE INVENTION

1. Field of the Invention

The present invention generally relates to an apparatus and a method for manufacturing a liquid crystal display panel. More particularly, the present invention relates to a technique of injecting a liquid crystal material in a liquid crystal display panel including film substrates.

2. Description of the Related Art

In recent years, display devices including flexible film substrates instead of conventionally used glass substrates have been developed in the fields of liquid crystal displays, organic EL (Electro Luminescence) displays, and the like.

For example, Japanese Published Patent Application No. S62-66229 discloses a manufacturing method of a liquid crystal display device (a liquid crystal display panel) in which a pair of flexible substrates, such as plastic films, having upper and lower electrodes formed thereon are positioned so as to face each other, and are bonded in this state with an adhesive along the whole periphery except a portion serving as an injection port, and a liquid crystal material is injected from the injection port. In this manufacturing method, the injection port is formed in a corner, and the corner is cut after the liquid crystal material is injected and sealed. Japanese Published Patent Application No. S62-66229 describes that, according to this method, only a very small portion of the outer surface of the device gets wet with the liquid crystal material, which saves the liquid crystal material and suppresses contamination and degradation of the liquid crystal material.

Incidentally, a roll-to-roll method capable of continuously processing a film substrate is preferable in terms of productivity to manufacture a liquid crystal display panel using film substrates.

In this roll-to-roll method, a one drop fill (ODF) method has been invented, in which a liquid crystal material is injected between a pair of film substrates by, for example, first dropping the liquid crystal material onto one film substrate having a frame-shaped sealant formed thereon, and then bonding this film substrate and the other film substrate under vacuum so that no air bubble is introduced therebetween.

If a manufacturing process of the roll-to-roll method involves a vacuum process using such an ODF method, however, a processing chamber for bonding the pair of film substrates need to be evacuated for every processing unit, which reduces the manufacturing efficiency.

SUMMARY OF THE INVENTION

In view of the above problems, preferred embodiments of the present invention provide a display device in which a liquid crystal material is filled between a pair of film substrates under normal pressure while preventing introduction of air bubbles.

In accordance with a preferred embodiment of the present invention, a pair of film substrates are sequentially bonded from one end toward the other end under normal pressure after a cut-out is formed on the other end side of a sealant of one film substrate and a liquid crystal material is supplied to one end side of one film substrate or the other film substrate. The film substrates are pressed so that a pressure in the middle of the film substrates becomes higher than that at both ends thereof, and then, the cut-out of the sealant is sealed.

More specifically, an apparatus for manufacturing a liquid crystal display panel according to a preferred embodiment of the present invention is an apparatus for manufacturing a liquid crystal display panel by sequentially bonding a pair of film substrates, each having a display region defined therein, from one end toward the other end under normal pressure so that the respective display regions of the film substrates overlap each other. A sealant having a cut-out formed at least on the other end side of the display region, for enclosing a liquid crystal material between the pair of film substrates, is provided on one of the film substrates, and the liquid crystal material is supplied to one end side of the display region in the one film substrate or the other film substrate. The apparatus preferably includes a bonding unit arranged to bond the pair of film substrates to each other through the sealant and the liquid crystal material by pressing respective surfaces of the film substrates so that a pressure in a middle of the film substrates becomes higher than that at both ends thereof and a sealing unit arranged to seal the cut-out of the sealant to the pair of film substrates bonded in the bonding unit.

According to the above structure, the bonding unit presses the respective surfaces of the film substrates so that the pressure in the middle of the film substrates becomes higher than that at both ends thereof. Thus, when the pair of film substrates are sequentially bonded from one end toward the other by the bonding unit, the liquid crystal material supplied to one end side of the display region in one film substrate or the other film substrate is sequentially spread in the direction toward the other end of each film substrate and in the width direction thereof in a region inside the sealant provided on one film substrate. In the sealant for enclosing the liquid crystal material, the cut-out capable of releasing air, which causes air bubbles, is formed at least on the other end side of the display region in the film substrate. Thus, the pair of film substrates can be bonded while preventing introduction of air bubbles. Moreover, the cut-out of the sealant in the bonded pair of film substrates is sealed by the sealing unit. Thus, the liquid crystal material is enclosed without introducing air bubbles between the pair of film substrates. Accordingly, the liquid crystal material can be enclosed between the pair of film substrates under normal pressure while preventing introduction of air bubbles.

The bonding unit may include a pair of bonding rolls, and at least one of the bonding rolls may be constructed so as to have a larger outer diameter in a middle than at both ends thereof.

According to the above structure, one or both of the pair of bonding rolls of the bonding unit are preferably constructed so as to have a larger outer diameter in the middle than at both ends. Thus, when the pair of bonding rolls are brought into close contact with each other through the pair of film substrates to bond the pair of film substrates by the bonding unit, the respective surfaces of the film substrates are pressed with a higher pressure in the middle than that at both ends. Thus, desirable functions and effects of a preferred embodiment of the present invention are specifically achieved.

At least one of the pair of bonding rolls may include a rigid cylinder portion, and an elastic exterior portion arranged to cover a peripheral wall of the cylinder portion and which is preferably constructed to have a larger outer diameter in a middle than at both ends thereof.

According to the above structure, when the pair of bonding rolls are brought into close contact with each other through the pair of film substrates to bond the pair of film substrates by the bonding unit, the exterior portion of one or both bonding rolls is elastically deformed more in the middle than at both ends. Thus, the film substrates are pressed with a higher pressure in the middle than that at both ends. Thus, desirable functions and effects of a preferred embodiment of the present invention are specifically achieved.

The above apparatus may further include a liquid crystal supply unit arranged to supply the liquid crystal material to the one film substrate or the other film substrate in a line shape along a width direction of the film substrate.

According to the above structure, the liquid crystal supply unit supplies the liquid crystal material in a line shape along the width direction of the film substrate. Thus, the liquid crystal material is reliably spread in the width direction of each film substrate.

The bonding unit may be configured so that a portion of the liquid crystal material overflows through the cut-out of the sealant when the pair of film substrates are bonded, and the above apparatus may further include a liquid crystal removing unit arranged to remove the liquid crystal material which has overflowed through the cut-out of the sealant.

According to the above structure, when the pair of film substrates are bonded by the bonding unit, a portion of the liquid crystal material located inside the air, which causes air bubbles, between the pair of film substrates overflows through the cut-out of the sealant. Thus, introduction of air bubbles can be reliably prevented during bonding of the pair of film substrates. Moreover, since the overflow liquid crystal material is removed by the liquid crystal removing unit, the cut-out of the sealant can be sealed by the sealing unit.

The pair of film substrates may be formed so that both side end regions of one film substrate are exposed from the other film substrate. The bonding unit may be configured so that a portion of the liquid crystal material overflows to each side end region of the one film substrate through the cut-out of the sealant. The liquid crystal removing unit may include a liquid crystal removing squeegee which is in contact with a surface of each side end region of the one film substrate.

According to the above structure, the side end regions are provided at both ends of one film substrate by, for example, setting the width of one film substrate to a larger value than the width of the other film substrate. After a portion of the liquid crystal material is caused to overflow to each side end region through the cut-out of the sealant by the bonding unit, a liquid crystal removing squeegee of the liquid crystal removing unit is brought into contact with the surface of each side end region in order to scrape off the overflow liquid crystal material by the tip of the liquid crystal removing squeegee. Thus, desirable functions and effects of a preferred embodiment of the present invention are specifically achieved.

The sealing unit may include a resin supply machine arranged to supply a resin to the cut-out of the sealant, and a resin curing machine arranged to cure the resin supplied by the resin supply machine.

According to the above structure, the resin supplied to the cut-out of the sealant by the resin supply machine is cured by the resin curing machine. Thus, desirable functions and effects of a preferred embodiment of the present invention are specifically achieved.

The pair of film substrates may be arranged so that both side end regions of one film substrate are exposed from the other film substrate. The cut-out of the sealant may be formed so as to open to each side end region of the one film substrate. The sealing unit may include, between the resin supply machine and the resin curing machine, a resin removing squeegee which is in contact with a surface of each side end region of the one film substrate, to remove a portion of the resin.

According to the above structure, the side end regions are provided at both ends of one film substrate by, for example, setting the width of one film substrate to a larger value than the width of the other film substrate. The cut-out of the sealant is formed so as to open to each side end region. By supplying a resin from the resin supply machine to the side end regions of one film substrate connecting to the cut-out of the sealant, and then bringing the resin removing squeegee into contact with the surface of each side end region, the resin is cured by the resin curing machine after a portion of the resin is scraped off by the tip of the resin removing squeegee. Thus, desirable functions and effects of a preferred embodiment of the present invention are specifically achieved.

A plurality of the display regions may be successively arranged along a longitudinal direction in at least one of the pair of film substrates, and the apparatus may further include a wind-off roll arranged to wind off the film substrate, having the multiple display regions defined therein, to the bonding unit.

According to the above structure, multiple display regions are successively arranged along the longitudinal direction in at least one of the pair of film substrates, and the apparatus includes the wind-off roll arranged to wind off the long film substrate to the bonding unit. Thus, a roll-to-roll type manufacturing apparatus is configured specifically, whereby the manufacturing efficiency of a liquid crystal display panel can be improved.

Moreover, a method for manufacturing a liquid crystal display panel according to a preferred embodiment of the present invention is a method for manufacturing a liquid crystal display panel by sequentially bonding a pair of film substrates, each having a display region defined therein, from one end toward the other end under normal pressure so that the respective display regions of the film substrates overlap each other. The method preferably includes a sealant forming step of forming a sealant, for enclosing a liquid crystal material between the pair of film substrates, on one of the film substrates so that a cut-out is formed at least on the other end side of the display region; a liquid crystal supplying step of supplying the liquid crystal material to one end side of the display region in the one film substrate or the other film substrate; a bonding step of, after performing the sealant forming step and the liquid crystal supplying step, bonding the pair of film substrates to each other through the sealant and the liquid crystal material by pressing respective surfaces of the film substrates so that a pressure in a middle of the film substrates becomes higher than that at both ends thereof; and a sealing step of sealing the cut-out of the sealant to the pair of film substrates bonded in the bonding step.

According to the above method, the respective surfaces of the film substrates are pressed with a higher pressure in the middle than that at both ends in the bonding step. Thus, when the pair of film substrates are sequentially bonded from one end toward the other in the bonding step, the liquid crystal material supplied to one end side of the display region in one film substrate or the other film substrate in the liquid crystal supplying step is sequentially spread in the direction toward the other end of each film substrate and in the width direction thereof in a region inside the sealant provided on one film substrate in the sealant forming step. In the sealant for enclosing the liquid crystal material, the cut-out capable of releasing air, which causes air bubbles, is formed at least on the other end side of the display region in the film substrate in the sealant forming step. Thus, the pair of film substrates can be bonded in the bonding step while preventing introduction of air bubbles. Moreover, the cut-out of the sealant in the bonded pair of film substrates is sealed in the sealing step. Thus, the liquid crystal material is enclosed without introducing air bubbles between the pair of film substrates. Accordingly, the liquid crystal material can be enclosed between the pair of film substrates under normal pressure while preventing introduction of air bubbles.

In the sealant forming step, the cut-out of the sealant may be formed so as to open to a lateral side of the pair of film substrates.

According to the above method, the cut-out of the sealant is formed so as to open to the lateral side of the pair of film substrates in the sealant forming step. Thus, the air which causes air bubbles (and a portion of the liquid crystal material) can be discharged to the lateral side of each film substrate through the cut-out of the sealant when the pair of film substrates are bonded in the bonding step.

In the liquid crystal supplying step, the liquid crystal material may be supplied in a line shape along a width direction of the one film substrate or the other film substrate.

According to the above method, the liquid crystal material is supplied in a line shape along the width direction of the film substrate in the liquid crystal supplying step. Thus, the liquid crystal material is reliably spread in the width direction of each film substrate.

In the bonding step, a portion of the liquid crystal material may be caused to overflow through the cut-out of the sealant, and the method may further includes a liquid crystal removing step of removing the liquid crystal material which has overflowed through the cut-out of the sealant.

According to the above method, when the pair of film substrates are bonded in the bonding step, a portion of the liquid crystal material located inside the air, which causes air bubbles, between the pair of film substrates overflows through the cut-out of the sealant. Thus, introduction of air bubbles can be reliably prevented during bonding of the pair of film substrates. Moreover, since the overflow liquid crystal material is removed in the liquid crystal removing step, the cut-out of the sealant can be sealed in the sealing step.

In the sealing step, a resin may be supplied to the cut-out of the sealant.

According to the above method, the cut-out of the sealant is sealed by supplying the resin to the cut-out of the sealant in the sealing step. Thus, desirable functions and effects of a preferred embodiment of the present invention are specifically achieved.

The resin may be supplied to the cut-out of the sealant by supplying the resin to a lateral side of the pair of film substrates.

According to the above method, the cut-out of the sealant is sealed in the sealing step by supplying the resin to the lateral side of the pair of film substrates including the cut-out of the sealing member. This strengthens sealing of the cut-out of the sealant.

The resin may be an ultraviolet-curable resin, for example.

According to the above method, the cut-out of the sealant is specifically sealed in the sealing step by supplying the ultraviolet-curable resin to the cut-out of the sealant, and then curing the resin by ultraviolet radiation.

A deaeration process for deaerating the liquid crystal material to be supplied in the liquid crystal supplying step may be performed before the liquid crystal supplying step.

According to the above method, air bubbles contained in the liquid crystal material are removed by the deaeration process which is performed before the liquid crystal supply step. This prevents generation of air bubbles between the pair of film substrates.

A plurality of the display regions may be successively arranged along a longitudinal direction in at least one of the pair of film substrates, and the film substrate having the plurality of the display regions defined therein may be continuously processed by a roll-to-roll method.

According to the above method, multiple display regions are successively arranged along the longitudinal direction in at least one of the pair of film substrates, and the long film substrate is continuously processed by the roll-to-roll method. Thus, the manufacturing efficiency of the liquid crystal display panel can be improved.

According to a preferred embodiment of the present invention, a pair of film substrates are sequentially bonded from one end toward the other end under normal pressure after a cut-out is formed on the other end side of a sealant of one film substrate and a liquid crystal material is supplied to one end side of one film substrate or the other film substrate. The film substrates are pressed so that the pressure in the middle of the film substrates becomes higher than that at both ends thereof, and then, the cut-out of the sealant is sealed. Thus, the liquid crystal material can be enclosed between the pair of film substrates under normal pressure while preventing introduction of air bubbles.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Hereinafter, preferred embodiments of the present invention will be described in detail based on the accompanying drawings. Note that the present invention is not limited to the preferred embodiments described below.

Figure 1:
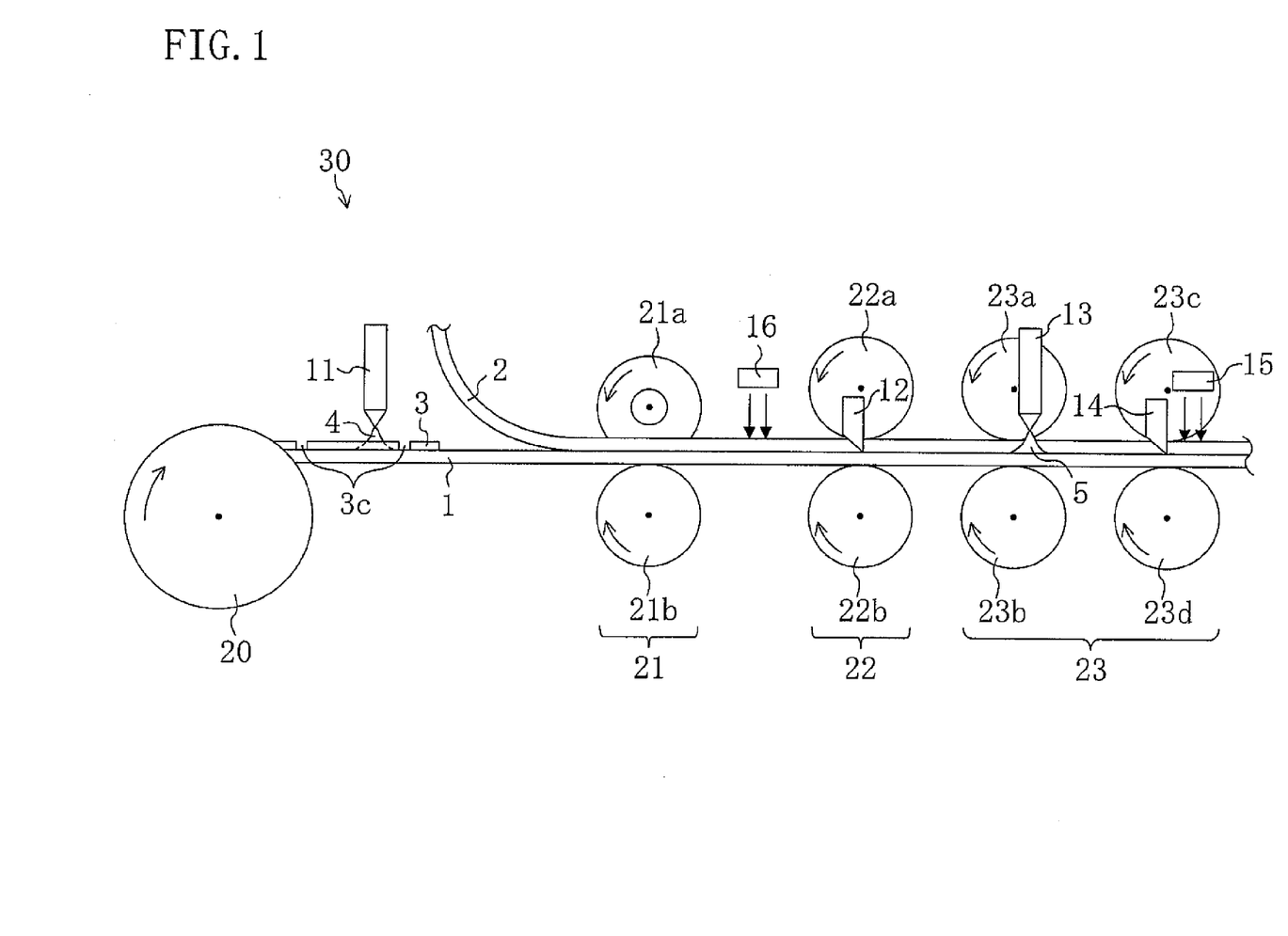
FIG. 1 is a side view of a normal-pressure liquid crystal injection apparatus 30 according to a preferred embodiment of the present invention.

First, a manufacturing apparatus of a liquid crystal display panel (a normal-pressure liquid crystal injection apparatus) according to the present preferred embodiment will be described. FIG. 1 is a side view of a normal-pressure liquid crystal injection apparatus 30 of the present preferred embodiment, and FIG. 2 is a top view thereof.

Figure 2:
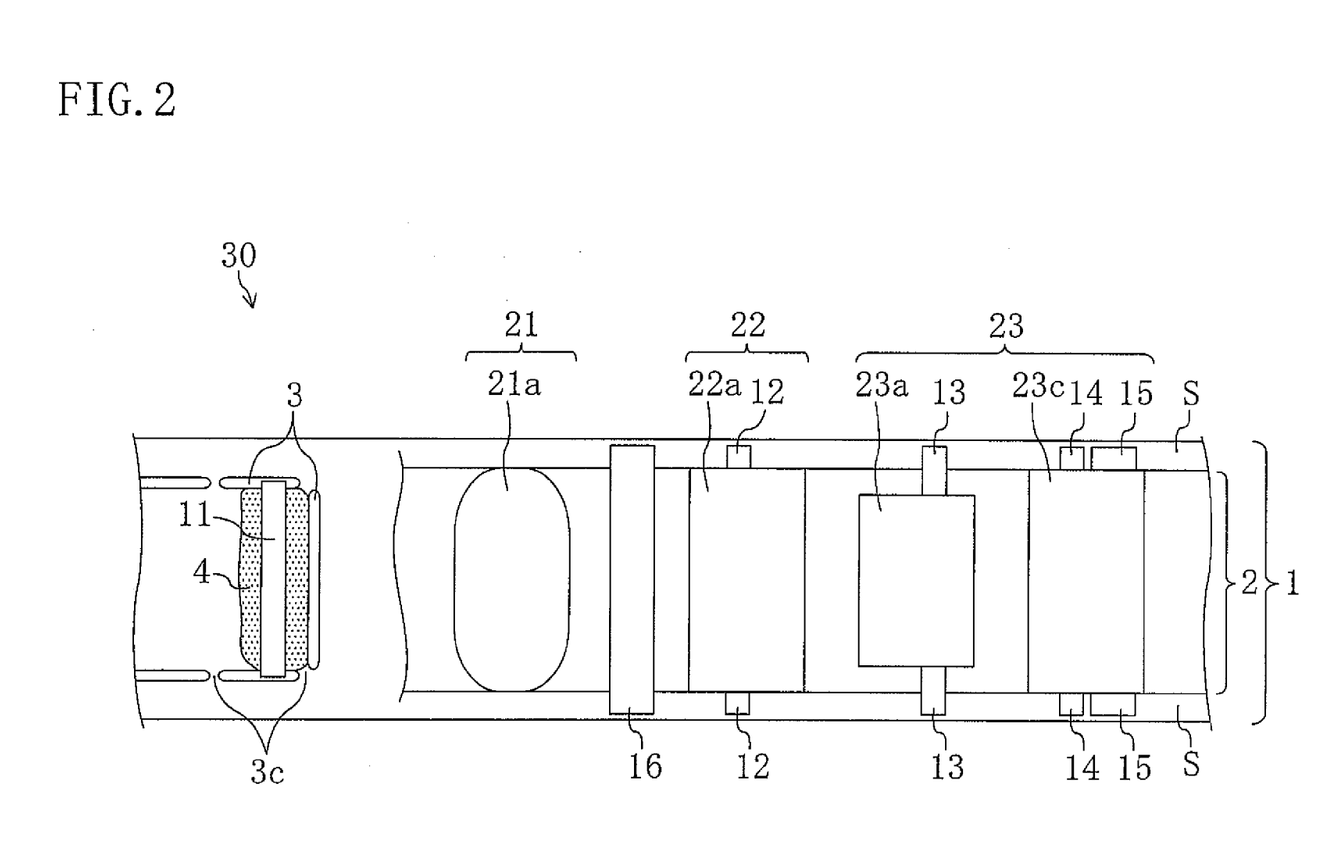
FIG. 2 is a top view of the normal-pressure liquid crystal injection apparatus 30.

As shown in FIGS. 1 and 2, the normal-pressure liquid crystal injection apparatus 30 includes a wind-off roll 20, a bonding unit 21, a liquid crystal removing unit 22, and a sealing unit 23, which are provided sequentially from left to right in the figures, and is configured so as to sequentially bond a TFT film substrate 1 and a CF film substrate 2 under normal pressure (atmospheric pressure) so that respective display regions D of the TFT film substrate 1 and the CF film substrate 2 overlap each other.

The wind-off roll 20 is configured so as to wind off the TFT film substrate 1, wound up in a roll, to the bonding unit 21. Note that, although not shown in FIGS. 1 and 2, a wind-off roll is also preferably provided for the CF film substrate 2 so as to wind off the CF film substrate 2 to the bonding unit 21.

The bonding unit 21 includes an upper bonding roll 21a and a lower bonding roll 21b (a pair of bonding rolls) so that the TFT film substrate 1 and the CF film substrate 2 are introduced therebetween in an overlapping manner, and are discharged after being pressed therebetween.

Figure 3:
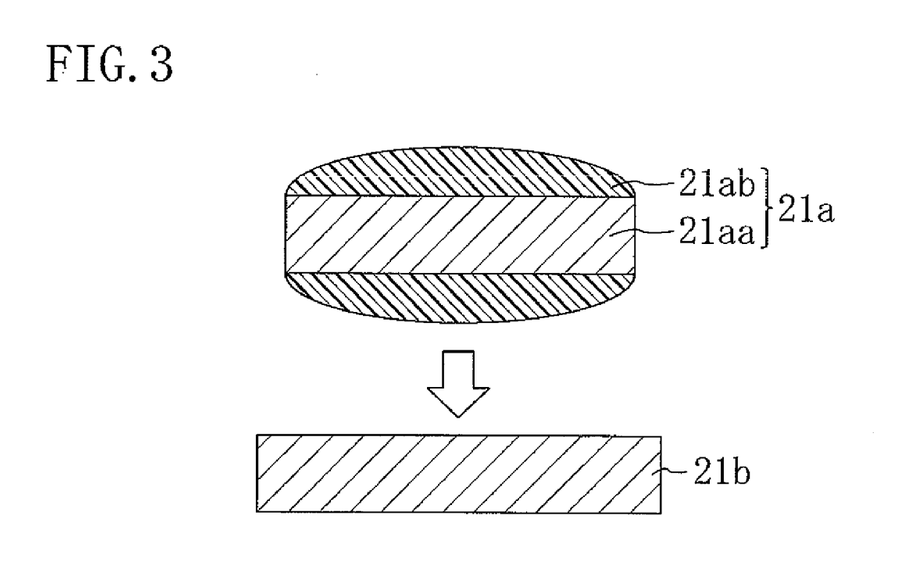
FIG. 3 is a cross-sectional view of a pair of bonding rolls 21a and 21b of the normal-pressure liquid crystal injection apparatus 30.

As shown in FIG. 3, the upper bonding roll 21a includes a cylindrical cylinder portion 21aa, and an exterior portion 21ab arranged so as to cover a peripheral wall of the cylinder portion 21aa. The cylinder portion 21as is preferably made of aluminum or other suitable material, and has rigidity (e.g., modulus of rigidity: about $25.5 \times 10^9$ N/m$^2$, for example). The exterior portion 21ab is preferably made of silicone rubber or other suitable material, and is constructed so that its outer diameter increases from both ends toward the middle in a tapered manner. The rubber preferably has a hardness of about 50 to about 80 when measured by a type-A durometer specified in JIS K 6253, and has elasticity.

The lower bonding roll 21b is preferably made of aluminum or other suitable material, and preferably has a cylindrical shape.

Figure 4:
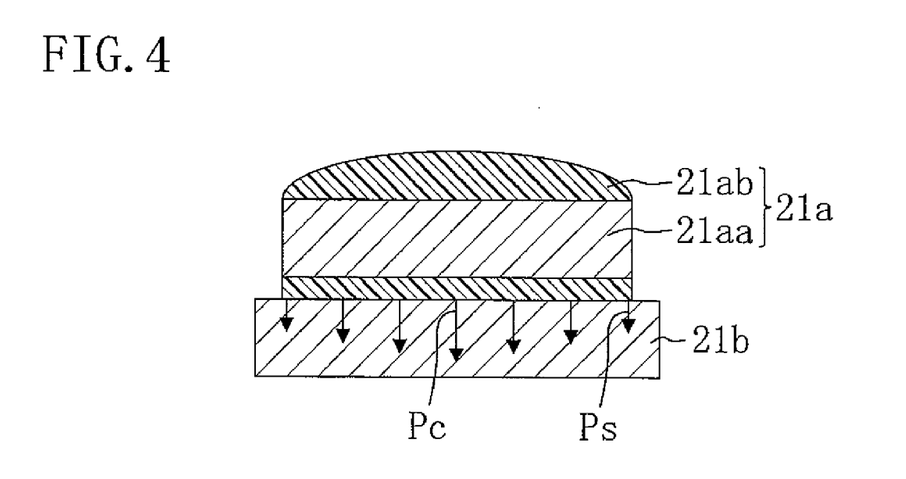
FIG. 4 is a cross-sectional view during pressing by the pair of bonding rolls 21a and 21b.

FIG. 3 is a cross-sectional view of the pair of bonding rolls 21a and 21b, and FIG. 4 is a cross-sectional view during pressing by the pair of bonding rolls 21a and 21b. The upper bonding roll 21a and the lower bonding roll 21b are configured as follows: when the upper bonding roll 21a and the lower bonding roll 21b are brought into close contact with each other through the TFT film substrate 1 and the CF film substrate 2, the middle of the exterior portion 21ab of the upper bonding roll 21a is elastically deformed more than both ends thereof so that a pressure Pc in the middle becomes higher than a pressure Ps at both ends, as shown in FIG. 4. Note that the TFT film substrate 1 and the CF film substrate 2 interposed between the pair of bonding rolls 21a and 21b are omitted in FIG. 4.

As shown in FIGS. 1 and 2, the liquid crystal removing unit 22 includes: a first upper feeding roll 22a and a first lower feeding roll 22b which are in close contact with each other through the TFT film substrate 1 and the CF film substrate 2 bonded together in the bonding unit 21; and a liquid crystal removing squeegee 12 which is in contact with the surface of both ends of the TFT film substrate 1 on a peripheral wall of the first lower feeding roll 22b, for scraping off an excess liquid crystal material 4.

As shown in FIGS. 1 and 2, the sealing unit 23 includes: a second upper feeding roll 23a and a second lower feeding roll 23b which are in close contact with each other through the TFT film substrate 1, from which the excess liquid crystal material 4 has been removed in the liquid crystal removing unit 22, and the CF film substrate 2; a resin dispenser 13 (a resin supply machine) arranged to supply a UV (ultraviolet)-curable resin 5 by dropping onto both ends of the TFT film substrate 1 on a peripheral wall of the second lower feeding roll 23b; a third upper feeding roll 23c and a third lower feeding roll 23d which are in close contact with each other through the TFT film substrate 1, to which the UV-curable resin 5 has been supplied from the resin dispenser 13, and the CF film substrate 2; a resin removing squeegee 14 which is in contact with the surface of both ends of the TFT film substrate 1 on a peripheral wall of the third lower feeding roll 23d, to scrape off an excess UV-curable resin 5; and a UV lamp 15 (a resin curing machine) arranged to radiate UV light to cure the UV-curable resin 5.

A liquid crystal dispenser 11 is provided between the wind-off roll 20 and the bonding unit 21 as a liquid crystal supply unit to supply a liquid crystal material 4 by dropping onto the surface of the TFT film substrate 1.

Moreover, a seal curing machine 16, such as a UV lamp or an infrared (IR) heater, is provided between the bonding unit 21 and the liquid crystal removing unit 22 in order to cure a sealant 3 interposed between the TFT film substrate 1 and the CF film substrate 2 which have been bonded together in the bonding unit 21.

Note that the respective widths of the upper bonding roll 21a, the first upper feeding roll 22a, the second upper feeding roll 23a, and the third upper feeding roll 23c are set corresponding to the width of the CF film substrate 2 which is brought into contact with their respective peripheral walls. Moreover, the respective widths of the lower bonding roll 21b, the first lower feeding roll 22b, the second lower feeding roll 23b, and the third lower feeding roll 23d are preferably set corresponding to the width of the TFT film substrate 1 which is brought into contact with their respective peripheral walls. Thus, the respective widths of the lower bonding roll 21b, the first lower feeding roll 22b, the second lower feeding roll 23b, and the third lower feeding roll 23d are preferably set to a larger value than the respective widths of the upper bonding roll 21a, the first upper feeding roll 22a, the second upper feeding roll 23a, and the third upper feeding roll 23c.

Each film substrate which is processed in the normal-pressure liquid crystal injection apparatus 30 of the above structure will be described below.

A plurality of display regions D are successively arranged along a longitudinal direction in the TFT film substrate 1 and the CF film substrate 2.

Each display region D of the TFT film substrate 1 includes, for example, a plurality of gate lines extending parallel to each other, a plurality of source lines extending parallel to each other in a direction perpendicular to the gate lines, a plurality of thin film transistors (hereinafter, referred to as the "TFTs") provided at each intersection of the gate lines and the source lines as switching devices, and a plurality of pixel electrodes provided respectively corresponding to the TFTs. Thus, each display region D of the TFT film substrate 1 has a structure of a so-called active matrix substrate.

Each display region D of the CF film substrate 2 includes, for example, a color filter having R, G, and B colored layers corresponding to each pixel electrode on the TFT film substrate 1, and a common electrode provided so as to cover the color filter. Thus, each display region D of the CF film substrate 2 has a structure of a so-called counter substrate.

Hereinafter, a method for manufacturing a liquid crystal display panel by using the normal-pressure liquid crystal injection apparatus 30 of the above structure will be described with reference to FIGS. 5 through 12. Note that, in FIGS. 5 through 11, an arrow at the bottom of the figure indicates a traveling direction of the film substrate, the right side in the figure indicates one end side of the film substrate, and the left side in the figure indicates the other end side of the film substrate. The manufacturing method of the liquid crystal display panel of the present preferred embodiment includes a preparing step, a sealant forming step, a liquid crystal dropping step (liquid crystal supplying step), a bonding step, and a liquid crystal removing step, and a sealing step.

Preparing Step

TFTs, pixel electrodes, and the like are formed by a roll-to-roll method or the like on, for example, a polyimide film of about 500 mm wide, about 50 m long, and about 100 μm thick to form a plurality of display regions D. Moreover, a color filter, a common electrode, and the like are formed by a roll-to-roll method or the like on, for example, a polyimide film of about 480 mm wide, about 50 m long, and about 100 μm thick to form a plurality of display regions D.

Thereafter, a polyimide film is printed on each polyimide film having the display regions D formed thereon, and a baking process and an alignment process are then performed to form an alignment film, thereby fabricating a TFT film substrate 1 and a CF film substrate 2.

Sealant Forming Step

Figure 5:
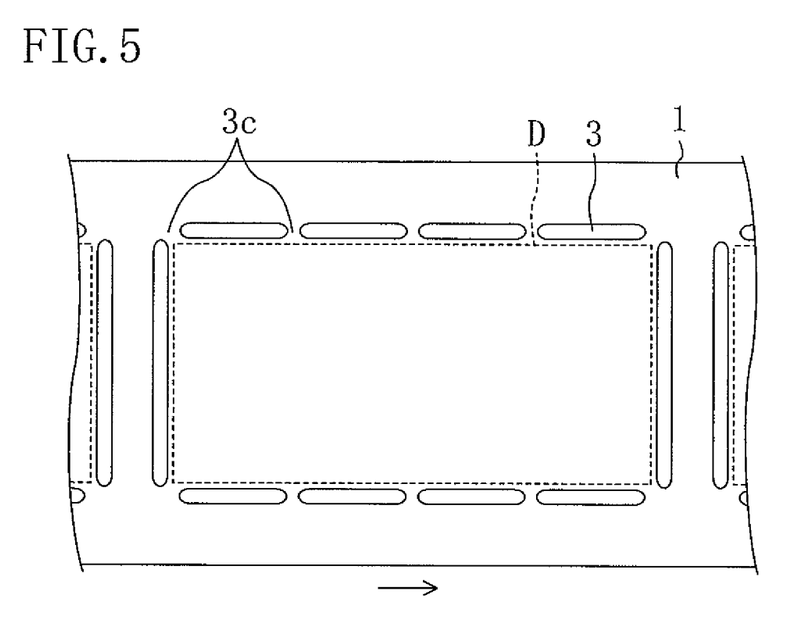
FIG. 5 is a top view of a TFT film substrate 1 with a sealant 3 drawn thereon.

As shown in FIG. 5, an epoxy resin, a hybrid resin (a resin combining an epoxy resin and a UV-curable resin), or a UV-curable resin is drawn or printed around each display region D of the TFT film substrate 1 to form a sealant 3 having cut-outs 3c. The cut-outs 3c are herein formed at least on the other end side (the left side in the figure) of each display portion D so as to open to a lateral side of the TFT film substrate 1 and the CF film substrate 2 when the TFT film substrate 1 and the CF film substrate 2 overlap each other. Moreover, the sealant 3 is formed by, for example, drawing an epoxy resin having a high viscosity of 300 Pa·s to a thickness of about 30 μm to about 40 μm by a dispenser, a screen printing machine, or the like, and pressing the epoxy resin to about 5 μm to about 8 μm by a bonding process. Note that, in addition to forming the cut-outs 3c of the sealant 3 by discontinuing a seal pattern at corresponding positions, the cut-outs 3c of the sealant 3 may be formed by thinning the sealant 3 at corresponding positions.

Liquid Crystal Dropping Step

Figure 6:
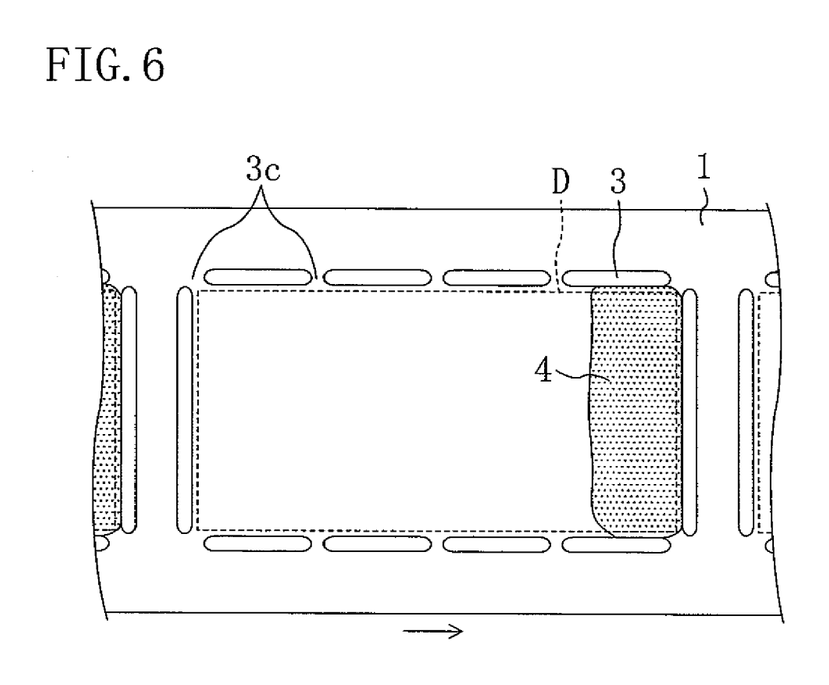
FIG. 6 is a top view of the TFT film substrate 1 with a liquid crystal material 4 dropped thereon.

As shown in FIGS. 1, 2, and 6, the liquid crystal material 4 is dropped from the liquid crystal dispenser 11 onto one end side (the right side in the figure) of each display region D of the TFT film substrate 1 in a line shape along a width direction of the TFT film substrate 1. Preferably, the liquid crystal material 4 to be dropped is deaerated in advance under vacuum.

Bonding Step

Figure 7:
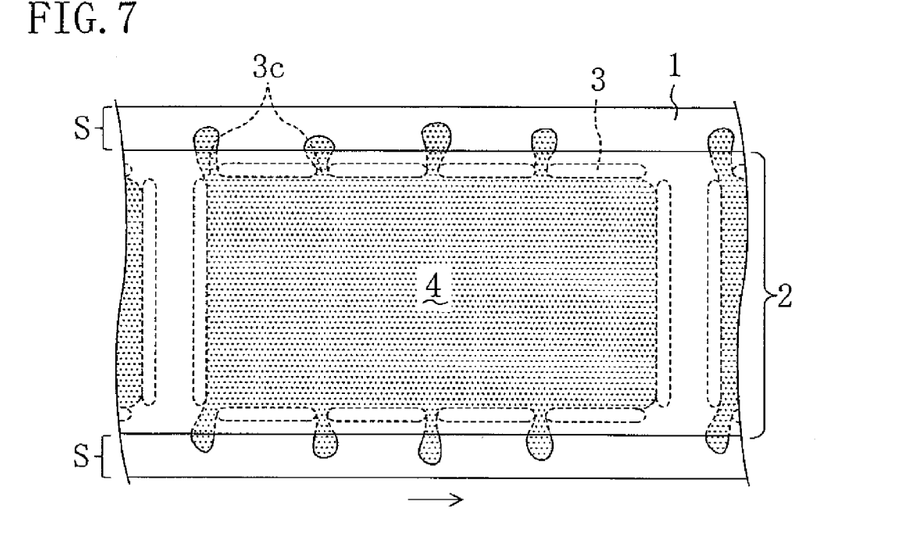
FIG. 7 is a top view of the TFT film substrate 1 and a CF film substrate 2 bonded together.

As shown in FIGS. 1 and 2, after the TFT film substrate 1 and the CF film substrate 2 are aligned so that the respective display regions D overlap each other, the respective surfaces of the TFT film substrate 1 and the CF film substrate 2 are pressed by the upper bonding roll 21a and the lower bonding roll 21b in the bonding unit 21 to bond the TFT film substrate 1 and the CF film substrate 2. At this time, the respective surfaces of the TFT film substrate 1 and the CF film substrate 2 are pressed with a higher pressure in the middle of the TFT film substrate 1 and the CF film substrate 2 than at both ends thereof, as shown in FIG. 4. Thus, in the TFT film substrate 1 and the CF film substrate 2 bonded together, an excess liquid crystal material 4 overflows into each side end region S at both ends of the TFT film substrate 1 through the cut-outs 3c of the sealant 3, as shown in FIG. 7. Each side end region S of the TFT film substrate 1 is a region which is exposed from the CF film substrate 2 by setting the width of the TFT film substrate 1 larger than that of the CF film substrate 2. Moreover, in order to prevent mixture of an uncured sealant 3 and the liquid crystal material 4, the sealant 3 is cured by the seal curing machine 16 to form a seal body (3a) right after the TFT film substrate 1 and the CF film substrate 2 are bonded.

Liquid Crystal Removing Step

Figure 8:
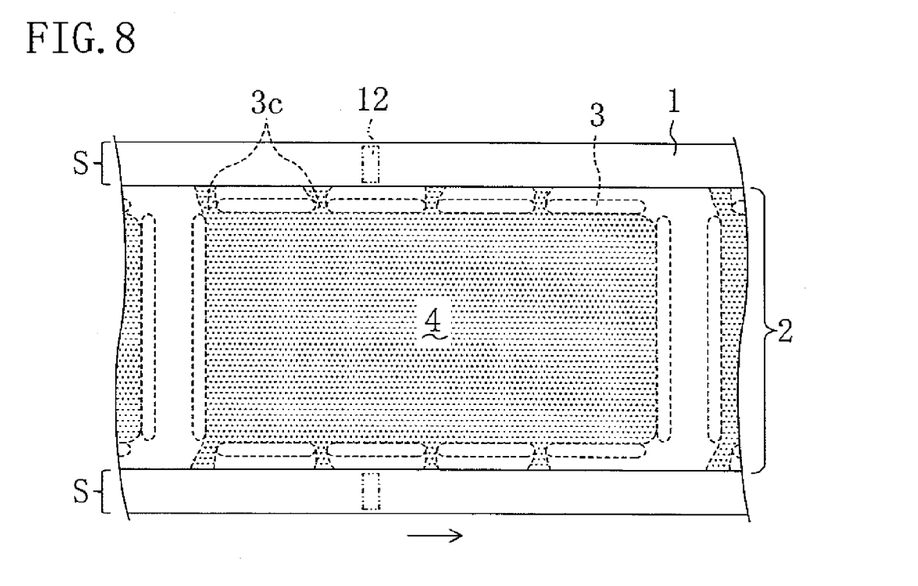
FIG. 8 is a top view of the TFT film substrate 1 and the CF film substrate 2 after the liquid crystal material 4 in side end regions S is wiped off.

As shown in FIGS. 1 and 2, in the liquid crystal removing unit 22, a rubber tip of the liquid crystal removing squeegee 12 is brought into contact with the surface of each side end region S of the TFT film substrate 1 on the first lower feeding roll 22b to scrape off an excess liquid crystal material 4 as shown in FIG. 8.

Sealing Step

Figure 9:
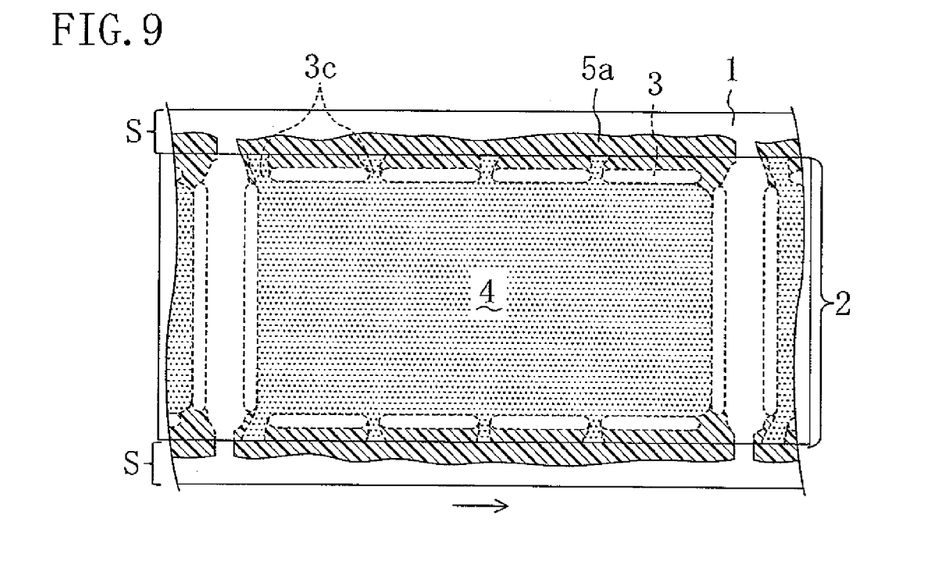
FIG. 9 is a top view of the TFT film substrate 1 and the CF film substrate 2 with a UV-curable resin 5a dropped on the side end regions S.
Figure 10:
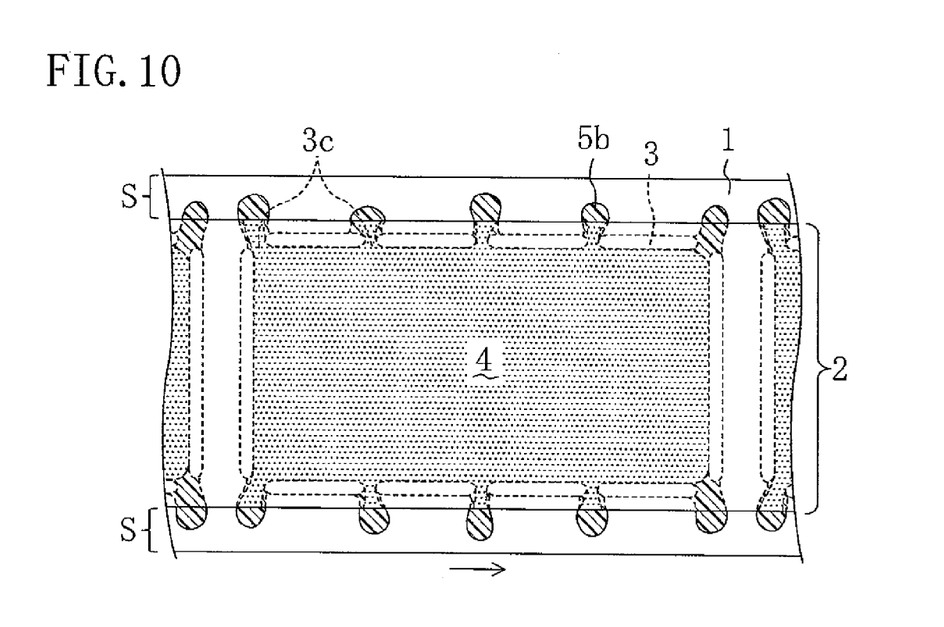
FIG. 10 is a top view of the TFT film substrate 1 and the CF film substrate 2 with a UV-curable resin 5b dropped in the side end regions S.

First, as shown in FIGS. 1 and 2, the UV-curable resin 5 is dropped from the resin dispenser 13 to each side end region S of the TFT film substrate 1 on the second lower feeding roll 23b of the sealing unit 23 so as to close the cut-outs 3c of the sealant 3. Dropping of the UV-curable resin 5 may be performed in any manner as long as the cut-outs 3c of the sealant 3 are closed. For example, dropping of the UV-curable resin 5 may be performed by covering most of the side surfaces of the CF film substrate 2 with a UV-curable resin 5a as shown in FIG. 9, or by covering only the periphery of each cut-out 3c of the sealant 3 with a UV-curable resin 5b as shown in FIG. 10.

Figure 11:
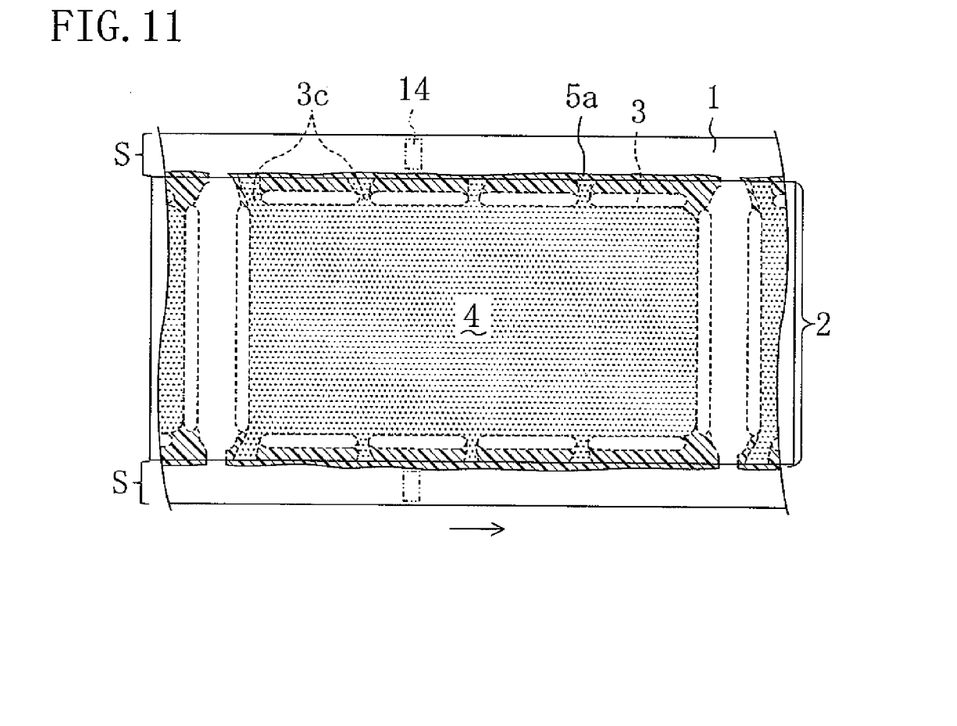
FIG. 11 is a top view of the TFT film substrate 1 and the CF film substrate 2 after an excess curable resin 5a in the side end regions S is wiped off.

Then, as shown in FIGS. 1 and 2, a rubber tip of the resin removing squeegee 14 is brought into contact with the surface of each side end region S of the TFT film substrate 1 on the third lower feeding roll 23d of the sealing unit 23 to scrape off an excess UV-curable resin 5a as shown in FIG. 11.

Then, the UV-curable resin 5a which has not been scraped off is cured by radiation of UV light from the UV lamp 15, thereby forming an end-seal body 5c (and the seal body 3a) for enclosing the liquid crystal material 4 between the TFT film substrate 1 and the CF film substrate 2.

Finally, the TFT film substrate 1 and the CF film substrate 2 with the liquid crystal material 4 enclosed therebetween are cut into cell units.

Figure 12:
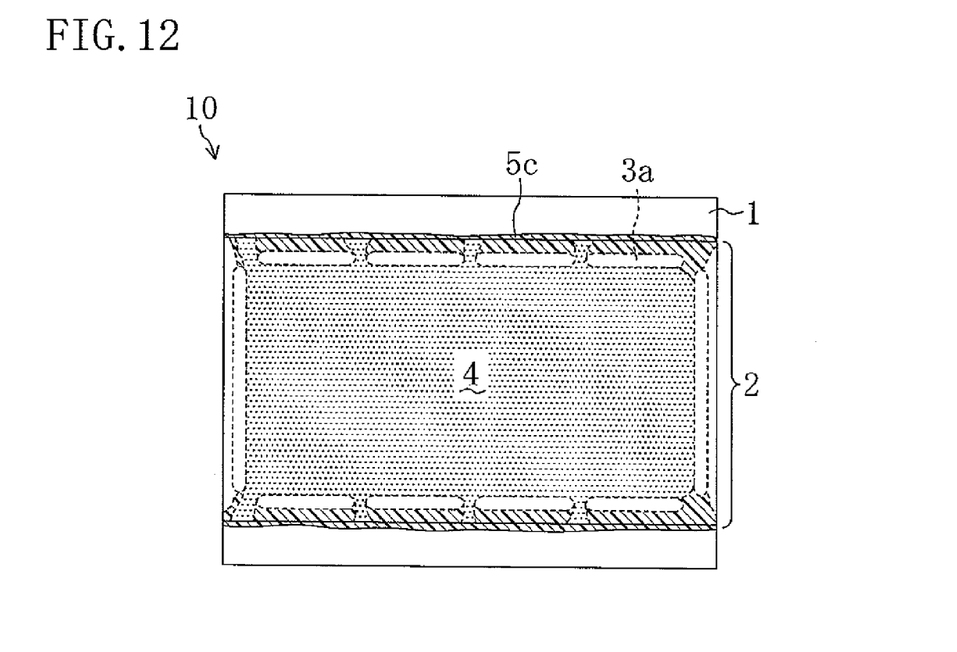
FIG. 12 is a top view of a liquid crystal panel 10 manufactured by using the normal-pressure liquid crystal injection apparatus 30.

A liquid crystal display panel 10 can be manufactured in this manner (see FIG. 12).

As described above, according to the normal-pressure liquid crystal injection apparatus 30 of the present preferred embodiment and the manufacturing method of the liquid crystal display panel including the same, the bonding unit 21 presses the respective surfaces of the TFT film substrate 1 and the CF film substrate 2 with a higher pressure in the middle of the TFT film substrate 1 and the CF film substrate 2 than at both ends thereof in the bonding step. Thus, when the TFT film substrate 1 and the CF film substrate 2 are sequentially bonded from one end toward the other by the bonding unit 21, the liquid crystal material 4 supplied to one end side of the display region D in the TFT film substrate 1 in the liquid crystal dropping step is sequentially spread in the direction toward the other end of the TFT film substrate 1 and the CF film substrate 2 and in the width direction thereof in a region inside the sealant 3 provided on the TFT film substrate 1 in the sealant forming step. In the sealant 3 arranged to enclose the liquid crystal material 4 in the sealant forming step, the cut-outs 3c capable of releasing air resulting in air bubbles are formed at least on the other end side of the display region D in the TFT film substrate 1. Thus, the TFT film substrate 1 and the CF film substrate 2 can be bonded while preventing introduction of air bubbles in the bonding step. Moreover, the cut-outs 3c of the sealant 3 in the TFT film substrate 1 and the CF film substrate 2 bonded together are sealed by the sealing unit 23. Thus, the liquid crystal material 4 can be enclosed without introducing air bubbles between the TFT film substrate 1 and the CF film substrate 2. Accordingly, the liquid crystal material 4 can be enclosed between the TFT film substrate 1 and the CF film substrate 2 under normal pressure while preventing introduction of air bubbles.

According to the present preferred embodiment, the upper bonding roll 21a of the bonding unit 21 is preferably constructed so as to have a larger outer diameter in the middle than at both ends. Thus, when the upper bonding roll 21a and the lower bonding roll 21b are brought into close contact with each other through the TFT film substrate 1 and the CF film substrate 2 to bond the TFT film substrate 1 and the CF film substrate 2 by the bonding unit 21, the exterior portion 21ab of the upper bonding roll 21a is elastically deformed more in the middle than at both ends. As a result, the respective surfaces of the TFT film substrate 1 and the CF film substrate 2 can be pressed with a higher pressure in the middle of the TFT film substrate 1 and the CF film substrate 2 than that at both ends thereof.

According to the present preferred embodiment, the liquid crystal dispenser 11 supplies the liquid crystal material 4 in a line shape along the width direction of the TFT film substrate 1 in the liquid crystal dropping step. Thus, the liquid crystal material 4 can be reliably spread in the width direction of the TFT film substrate 1 and the CF film substrate 2.

According to the present preferred embodiment, when the TFT film substrate 1 and the CF film substrate 2 are bonded by the bonding unit 21 in the bonding step, a portion of the liquid crystal material 4 located inside the air, which causes air bubbles, between the TFT film substrate 1 and the CF film substrate 2 overflows through the cut-outs 3c of the sealant 3. Thus, introduction of air bubbles can be reliably prevented during bonding of the TFT film substrate 1 and the CF film substrate 2. Moreover, since the overflow liquid crystal material 4 is removed by the liquid crystal removing unit 22 in the liquid crystal removing step, the cut-outs 3c of the sealant 3 can be sealed by the sealing unit 23 in the sealing step.

According to the present preferred embodiment, the side end regions S are provided at both ends of the TFT film substrate 1 by setting the width of the TFT film substrate 1 to a larger value than the width of the CF film substrate 2. After a portion of the liquid crystal material 4 overflows to each side end region S through the cut-outs 3c of the sealant 3 by the bonding unit 21, the liquid crystal removing squeegee 12 of the liquid crystal removing unit 22 is brought into contact with the surface of each side end region S, whereby the overflow liquid crystal material 4 can be scraped off by the tip of the liquid crystal removing squeegee 12. Moreover, after the UV-curable resin 5a is dropped from the resin dispenser 13 to the side end regions S of the TFT film substrate 1 connecting to the cut-outs 3c of the sealant 3, the resin removing squeegee 14 is brought into contact with the surface of each side end region S, whereby a portion of the UV-curable resin 5a can be scraped off by the tip of the resin removing squeegee 14. Moreover, UV light is applied from the UV lamp 15 to each side end region S of the TFT film substrate 1 and the periphery thereof, whereby the UV-curable resin 5a can be cured to form the end-seal body 5c.

According to the present preferred embodiment, the plurality of display regions D are successively arranged along the longitudinal direction in the TFT film substrate 1 and the CF film substrate 2, and the apparatus includes the wind-off rolls (20) arranged to wind off the long TFT film substrate 1 and the long CF film substrate 2 to the bonding unit 21. Thus, a roll-to-roll type manufacturing apparatus is configured specifically, whereby the manufacturing efficiency of the liquid crystal display panel 10 can be improved.

According to the present preferred embodiment, the cut-outs 3c of the sealant 3 are formed so as to open to the lateral side of the TFT film substrate 1 and the CF film substrate 2 in the sealant forming step. Thus, the air, which causes air bubbles, and a portion of the liquid crystal material 4 can be discharged to the lateral side of the TFT film substrate 1 and the CF film substrate 2 through the cut-outs 3c of the sealant 3 when the TFT film substrate 1 and the CF film substrate 2 are bonded in the bonding step.

According to the present preferred embodiment, the cut-outs 3c of the sealant 3 are sealed in the sealing step by supplying the UV-curable resin 5a to the lateral side of the CF film substrate 2 along the longitudinal direction so as to close the cut-outs 3c of the sealant 3. This strengthens sealing of the cut-outs 3c of the sealant 3.

According to the present preferred embodiment, air bubbles contained in the liquid crystal material 4 are removed by the deaeration process performed before the liquid crystal dropping step. This prevents generation of air bubbles between the TFT film substrate 1 and the CF film substrate 2.

In the present preferred embodiment, the apparatus structure and the manufacturing method for dropping the liquid crystal material 4 to the TFT film substrate 1 having the sealant 3 formed thereon were described by way of example. In the present invention, however, the sealant 3 may be formed on the CF film substrate 2, and the position of the TFT film substrate 1 and the CF film substrate 2 may be switched in the normal-pressure liquid crystal injection apparatus 30.

In the present preferred embodiment, each side end region S is defined preferably by setting the width of the TFT film substrate 1 to a larger value the width of the CF film substrate 2. In the present invention, however, a side end region may be provided in each side end of the TFT film substrate and the CF film substrate by preparing a TFT film substrate and a CF film substrate with the same width, and displacing both film substrates in the width direction. In this case, one side end region faces upward, while the other side end region faces downward.

In the present preferred embodiment, only the upper bonding roll 21a in the normal-pressure liquid crystal injection apparatus 30 is preferably shaped so as to have an increased diameter in the middle. In the present invention, however, the pair of bonding rolls may be shaped so as to have an increased diameter in the middle.

In the present preferred embodiment, the apparatus structure and the manufacturing method using the UV-curable resin 5 as a resin for sealing the cut-outs 3c of the sealant 3 were described by way of example. However, a thermosetting resin may be used by, for example, replacing the UV lamp 15 with an infrared heater.

In the present preferred embodiment, the present invention was described with respect to roll-to-roll manufacturing of a liquid crystal display panel. However, the present invention is applicable also to single-substrate manufacturing of a liquid crystal display panel.

In the present preferred embodiment, the present invention was described with respect to manufacturing of a liquid crystal display panel using film substrates. However, the present invention is applicable also to manufacturing of a liquid crystal display panel using glass substrates.

As described above, the present invention enables a liquid crystal material to be injected under normal pressure, and thus, is useful for roll-to-roll manufacturing of a liquid crystal display panel.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. An apparatus for manufacturing a liquid crystal display panel by sequentially bonding a pair of film substrates, each having a display region defined therein, from a first end toward a second end under normal pressure so that the respective display regions of the film substrates overlap each other, wherein a sealant having a cut-out formed at least on the second end side of the display region is arranged on one of the film substrates to enclose a liquid crystal material between the pair of film substrates, and the liquid crystal material is supplied to the first end side of the display region in the one film substrate or the other film substrate, the apparatus comprising:

a bonding unit arranged to bond the pair of film substrates to each other through the sealant and the liquid crystal material by pressing respective surfaces of the film substrates so that a pressure in a middle of the film substrates becomes higher than that at both ends thereof; and a sealing unit arranged to seal the cut-out of the sealant to the pair of film substrates bonded in the bonding unit.

2. The apparatus of claim 1, wherein the bonding unit includes a pair of bonding rolls, and at least one of the bonding rolls has a larger outer diameter in a middle than at both ends thereof.

3. The apparatus of claim 2, wherein at least one of the pair of bonding rolls includes a rigid cylinder portion, and an elastic exterior portion which covers a peripheral wall of the cylinder portion and which has a larger outer diameter in a middle than at both ends thereof.

4. The apparatus of claim 1, further comprising:

a liquid crystal supply unit arranged to supply the liquid crystal material to the one film substrate or the other film substrate in a line shape along a width direction of the film substrate.

5. The apparatus of claim 1, wherein the bonding unit is configured so that a portion of the liquid crystal material overflows through the cut-out of the sealant when the pair of film substrates are bonded, the apparatus further comprising:

a liquid crystal removing unit arranged to remove the liquid crystal material which has overflowed through the cut-out of the sealant.

6. The apparatus of claim 5, wherein the pair of film substrates are arranged so that both side end regions of one film substrate are exposed from the other film substrate, and the bonding unit is configured so that a portion of the liquid crystal material overflows to each side end region of the one film substrate through the cut-out of the sealant, and the liquid crystal removing unit includes a liquid crystal removing squeegee which is in contact with a surface of each side end region of the one film substrate.

7. The apparatus of claim 1, wherein the sealing unit includes a resin supply machine arranged to supply a resin to the cut-out of the sealant, and a resin curing machine arranged to cure the resin supplied by the resin supply machine.

8. The apparatus of claim 7, wherein the pair of film substrates are arranged so that both side end regions of one film substrate are exposed from the other film substrate, the cut-out of the sealant is formed so as to open to each side end region of the one film substrate, and the sealing unit includes, between the resin supply machine and the resin curing machine, a resin removing squeegee which is in contact with a surface of each side end region of the one film substrate, and arranged to remove a portion of the resin.

9. The apparatus of claim 1, wherein a plurality of the display regions are successively arranged along a longitudinal direction in at least one of the pair of film substrates, the apparatus further comprising:

a wind-off roll arranged to wind off the film substrate, having the plurality of display regions defined therein, to the bonding unit.

10. A method for manufacturing a liquid crystal display panel by sequentially bonding a pair of film substrates, each having a display region defined therein, from a first end toward a second end under normal pressure so that the respective display regions of the film substrates overlap each other, the method comprising:

a sealant forming step of forming a sealant, for enclosing a liquid crystal material between the pair of film substrates, on one of the film substrates so that a cut-out is formed at least on the second end side of the display region;

a liquid crystal supplying step of supplying the liquid crystal material to the first end side of the display region in the one film substrate or the other film substrate;

a bonding step of, after performing the sealant forming step and the liquid crystal supplying step, bonding the pair of film substrates to each other through the sealant and the liquid crystal material by pressing respective surfaces of the film substrates so that a pressure in a middle of the film substrates becomes higher than that at both ends thereof; and a sealing step of sealing the cut-out of the sealant to the pair of film substrates bonded in the bonding step.

11. The method of claim 10, wherein in the sealant forming step, the cut-out of the sealant is formed so as to open to a lateral side of the pair of film substrates.

12. The method of claim 10, wherein in the liquid crystal supplying step, the liquid crystal material is supplied in a line shape along a width direction of the one film substrate or the other film substrate.

13. The method of claim 10, wherein in the bonding step, a portion of the liquid crystal material is caused to overflow through the cut-out of the sealant, the method further comprising:

a liquid crystal removing step of removing the liquid crystal material which has overflowed through the cut-out of the sealant.

14. The method of claim 10, wherein in the sealing step, a resin is supplied to the cut-out of the sealant.

15. The method of claim 14, wherein the resin is supplied to the cut-out of the sealant by supplying the resin to a lateral side of the pair of film substrates.

16. The method of claim 14, wherein the resin is an ultraviolet-curable resin.

17. The method of claim 10, wherein a deaeration process for deaerating the liquid crystal material to be supplied in the liquid crystal supplying step is performed before the liquid crystal supplying step.

18. The method of claim 10, wherein a plurality of the display regions are successively formed along a longitudinal direction in at least one of the pair of film substrates, and the film substrate having the plurality of the display regions defined therein is continuously processed by a roll-to-roll method.

* * * * *